United States Patent Office 3,559,386
Patented Feb. 2, 1971

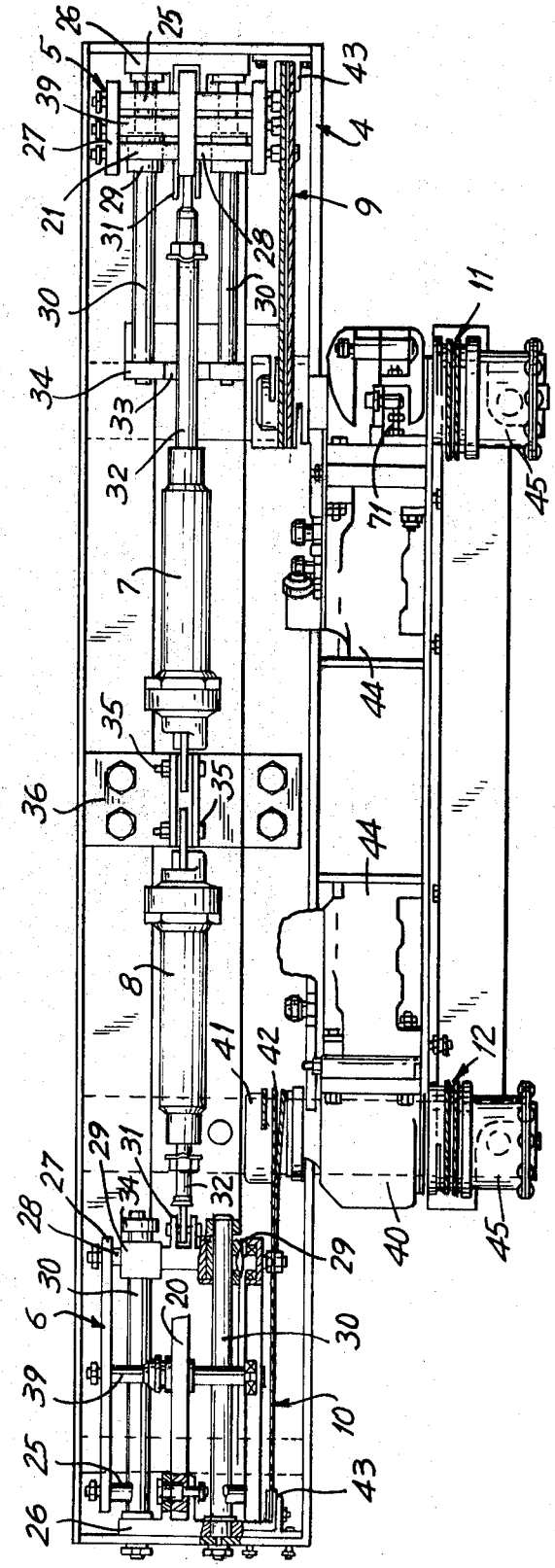

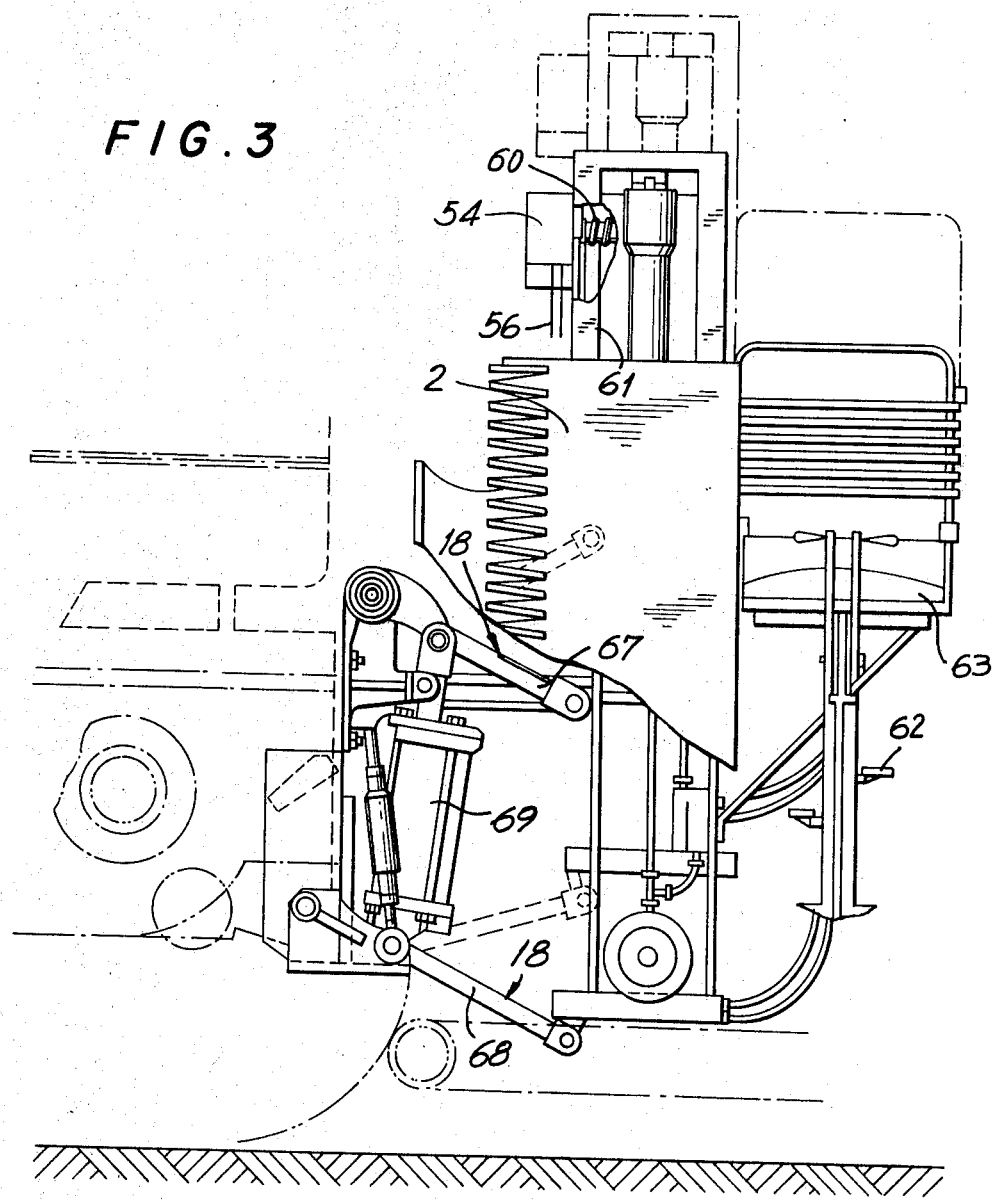

3,559,386
GRAPE HARVESTER
Vladimir Ivanovich Popov, Ulitsa Budennovskaya 203/2, kv. 9; and Cheslav Stanislavovich Tolochko, Ulitsa Budennovskaya 203/2, kv. 17, both of Novocherkassk; and Nikolai Grigorievich Kurgansky, Novocherkasskoe shosse 28, kv. 2; Vintsiant Yakovlevich Prokopenko, Novocherkasskoe shosse 34, kv. 22; and Ivan Gerasimovich Babenko, Novocherkasskoe shosse 15, kv. 6, all of Rostov-on-Don, U.S.S.R.
Filed Oct. 12, 1967, Ser. No. 674,938
Int. Cl. A01g 19/00
U.S. Cl. 56—331    4 Claims

ABSTRACT OF THE DISCLOSURE

A grape harvester comprises a frame carrying inclined guides on which a carriage is mounted for displacement therealong by means of a hydraulic cylinder. The carriage carries two hoists in the form of lazy tongs linkages which are independently raisable and lowerable and hoists are connected to a cutter at the ends thereof to modify the elevation and attitude of the cutter.

---

The present invention relates to grape harvesters for harvesting grapes from inclined trellises.

Known in the art are grape harvesters in which a working member with a cutter is mounted for displacement in relation to the frame of the harvester (cf. U.S. Pat. No. 2,893,194, 1956).

This known grape harvester permits harvesting from trellises on which the grapes are laid on a horizontal canopy. The cutter is arranged under said canopy, with an adjusting drum provided thereabove. During the harvester's advance in interrow spacings the cutter cuts pendent grapes.

A disadvantage of the known grape harvester is that it fails to harvest the grapes on an inclined canopy.

It is an object of the present invention to provide a grape harvester for operation in vineyards with inclined canopies of considerable width and flexible curved surfaces, which will also ensure an exact conformance of said surfaces by the cutter for a more complete cutting of the grapes without damaging separate grapes.

According to this and other objects, the invention consists in mounting, with the aid of two independently controlled hoists, the working member of the grape harvester on a carriage movable along inclined guides of the frame.

It is feasible to arrange the hoists of the grape harvester as coupled scissors-shaped multiarticulate linkages known as so-called "Nuremberg scissors" hinged by the top links to a bar bearing the working member, while the bottom links are coupled with the rods of the power cylinders of the independent control to raise and lower the hoists individually to modify the elevation and attitude of the working member.

Other objects and advantages of the present invention will become more apparent hereinbelow, upon considering the description of an exemplary embodiment thereof and the appended drawings, wherein:

FIG. 2 is an enlarged top view thereof without the working member; and

FIG. 3 is a side elevational view, with the working member partly broken away, of the mounting of the grape harvester on the tractor.

Figure 1:
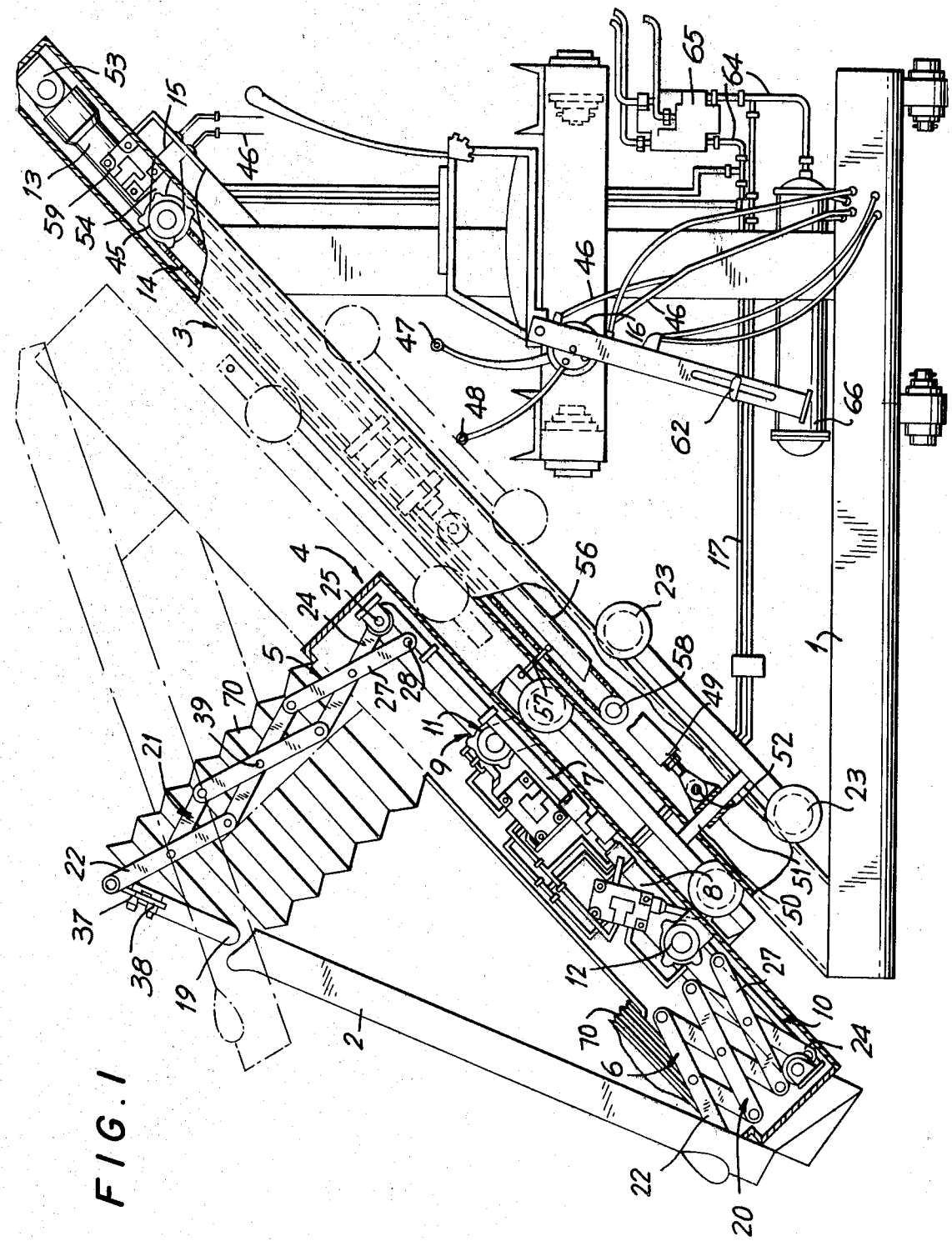
FIG. 1 is a rear elevation view of the grape harvester of the invention, with portions broken away and shown in section.

When describing the exemplary embodiment of the present invention narrow terminology has been used for the sake of clarity. However, the invention is not limited by the terms adopted and it should be borne in mind that each of these terms embraces all the equivalent elements working analogously and used to solve similar problems.

A grape harvester, according to the invention, comprises: a support frame 1 (FIG. 1); a working member 2; inclined guides 3 secured on the frame 1; a carriage 4 arranged on the inclined guides 3 and movable thereon; hoists 5 and 6 by which the working member 2 is mounted on the carriage 4; power cylinders 7 and 8 for the independent drive of the hoists 5 and 6; rope mechanisms 9 and 10 for the feedback or sensing of the degree of drive for the extension or retraction of said hoists 5 and 6 to terminate such drive when a predetermined position of the hoists has been achieved; rope mechanisms 11 and 12 for the direct feed of the hoists 5 and 6; a power cylinder 13 (FIG. 1) for the drive of the carriage 4; a rope mechanism 14 for the feedback of the drive of the carriage 4; a rope mechanism 15 for the direct feed of control of the carriage 4; a control panel 16; a hydraulic system 17 for the drive of the power cylinders 7, 8 and 13; and a parallelogram device 18 (FIG. 3) for mounting the frame 1 of the grape harvester on the tractor. By "feedback" mechanisms are meant devices which sense the magnitude of operation under direct drive for the de-actuation of the direct drive after a predetermined degree of operation has been achieved.

The working member 2 (FIG. 1) comprises the support bar 19. Each hoist 5 and 6 is constituted as a respective linkages 20 and 21 of "lazy-tongs" form as shown in FIG. 1. The support bar 19 is attached at opposite ends to the hoists 5 and 6, the connection with hoist 5 being shown in detail in FIG. 1, while the connection with hoist 6, which is similar, is not shown. The support bar is hingeably mounted on the hoists. The hoists 5 and 6 are identical, and in the lazy tongs construction each pair of links are connected at the centers by means of a pin 39, while the ends of links of said pair are connected to the ends of links of the next pair. In the upper pair of each hoist, one link 22 is hinged via finger 37 to a bracket 38 of the support bar 19. The lower pair of hinges of each hoist comprises a link 24 which is hinged by pin 25 to a bracket 26 affixed to the carriage 4, and a link 27, which is hinged by means of a pin 28 to a bracket 29 which is guidably displaceable along guides 30.

The inclined guides 3 are constituted as spaced channel members with flanges.

The carriage 4 is mounted on the inclined guides 3 of the frame 1 by means of rollers 23 for reciprocating back and forth along said guides 3.

The rollers 23 are provided both on top and at the bottom of the flanged channels.

To preclude damage of the rods 32 of the power cylinders 7 and 8, during the operation thereof, they are disposed in holes 33 of the bracket 34. The power cylinders 7 and 8 are hinged by bolts 35 in a bracket 36 of the carriage 4.

The rope mechanisms 9 and 10 (FIG. 2) of the feedback of the hoists 5 and 6 are made up of planetary reducing gears 40, drums 41 connected with the aid of ropes 42 to the links 27 via rollers 43, and slide valve distributors 44 connected with the planetary reducing gears 40 and designed to control the power cylinders 7 and 8 as well as the hoists 5 and 6. Said planetary reducing gears 40, drums 41 and slide-valve distributors 44 are secured on the carriage 4.

The rope mechanisms 11 and 12 of the direct feed of the hoists 5 and 6 comprises: drums 45 connected to the planetary reducing gears 40 and rotatable independently of the drums 41, and rope mechanisms 9 and 10 of the feedback of the hoists 5 and 6; ropes 46 wound on the drums 45 and connected with handles 47 and 48 of the control panel 16.

The power cylinder 13 of the drive of the carriage 4 is placed between the inclined guides 3 and is connected by its rod 49 to a journal 50 of the carriage 4 with the aid of a bushing 51 and a pin 52, while the cylinder proper is articulated to the top of the inclined guide 3 with the aid of a bracket 53.

The rope mechanism 14 of the feedback of the drive of the carriage 4 comprises a planetary reducing gear 54, a drum connected by means of a rope 56 and a clip 57 to rollers 58, and a slide valve distributor 59 connected with the planetary reducing gear 54 and designed to control the power cylinder 13 of the carriage 4 drive.

The planetary reducing gear 54, the drum 55 and the slide-valve distributor 59 are arranged on the inclined guides 3.

The direct feed rope mechanism 15 of the carriage 4 control comprises a drum 60 (FIG. 3) connected to the planetary reducing gear 54 and rotatable independently of the drive 55 of the feedback rope mechanism 14 of the carriage 4 drive; a rope 61 wound on the drum 60 and connected with pedals 62 of the control panel 16.

The control panel 16 also includes a seat 63.

The hydraulic system (FIG. 1) of the drive comprises: pipings 64, a safety valve 65 and a hydraulic source 66.

The parallelogram device 18 (FIG. 3) for mounting the frame 1 of the grape harvester onto the tractor serves to extend the range of vertical travelling of the working member and comprises upper arms 67 (only one of which is shown in FIG. 3) connected with the tractor mounting and with the frame of the grape harvester; two bottom arms 68 (only one visible in FIG. 3) connected with the tractor frame by attachment of one of their ends thereto and with the frame 1 of the grape harvester by attachment of their other ends; and a power cylinder 69 connected with the top arms 67.

To preclude penetration of dust into the linkages 20 and 21, they are enclosed in corrugated protective cases 70.

The operation of the grape harvester according to the invention is as follows.

As soon as the grape harvester reaches the interrow spacings of the vineyard, the tractor driver cuts in the supply of the working fluid from the tractor into the hydraulic system 17 of the machine.

By manipulating the handles 47, 48 and the pedals 62, the operator brings the cutter 2 under the trellis canopy in a cutting area, seeking to achieve a complete cutting of the grapes by their fruit stems.

As the size of the cutter 2 corresonds to an interval between the trellis wires, the operator may bring the cutter 2 closer to the curved surface of the trellis depending upon the particular conditions, by hoisting or lowering the edges of the cutter 2. The pulling of both handles 47 and 48 results in a parallel lowering of the edges of said cutter 2, while their pushing causes their corresponding elevation. The travel of one control handle results in raising one edge of the cutter 2, while the travel of the other causes the elevation of the second edge of the cutter 2.

The control system of the grape harvester allows a simutaneous travelling of one edge of the cutter 2 upwards and of the other edge downwards, the carriage 4 advancing simultaneously along the guides 3 to any side.

When the operator moves the control handles 47, its controlling motion of the rope of the direct feed rope mechanism 11 is transmitted to the drum 45 of the planetary reducing gear 40. Said drum 45 of the planetary reducing gear 40 begins rotating, thus actuating a slide valve 71 of the slide valve distributor 44. The slide valve 71 (FIG. 2) of said distributor 44 becomes displaced, thereby enabling the working fluid to pass from a head piping of the hydraulic system 17 of the drive to the power cylinder 7.

The rod 32 of the power cylinder 7 begins to displace, forcing the lower links 27 of the articulated linkage hoist 5 to move along the guides 30. Simultaneously, the other lower links 24 of the linkage 20 begin to turn around the pin 25; as a result, the lower ends 24 and 27 come together, thus bringing about the elevation of the upper link 22 of the linkage 20. Motion from the upper link 22 of the linkage 20 is transmitted to the bearing bar 19 of the cutter 2 via a hinge, the finger 37 and the bushing 38.

Concurrently, as soon as the link 27 of the articulated linkage hoist 5 begins advancing along the guides 30 of the carriage 4, its motion is transmitted to the rope 42 and, via the latter, to the drum 41 of the planetary reducing gear 40. The drum 41 of the planetary reducing gear 40, while rotating independently of the drum 45 of the direct feed of the planetary reducing gear 40, transmits a signal to the slide valve 71 and pulls it in the opposite direction. The supply of the working fluid into the power cylinder 7 discontinues, and the latter stops.

By summing the information fed from the direct feed drum 45 and feedback drum 41, the planetary reducing gear 40 puts the slide valve 71 of the slide-valve distributor 44 in the neutral right- or left-hand position. Accordingly, the rod 32 of the power cylinder 7 remains immovable, being pushed or pulled.

Thus, the slightest displacement of the handle 47 brings about an instantaneous displacement of an edge of the cutter 2 to a travel valve proportionate to the value of displacement of the handle 47 of the control panel 16.

The operation of the power cylinder 8 from the control handle 48 and the displacement of the carriage 4 from the pedals 61 takes place in a similar way.

Harvesting of the grapes irregularly scattered throughout the width of the trellis canopy is effected by moving the cutter 2 across the trellis owing to the travel of the carriage 4 along the guides 3 of the frame 1 of the grape harvester, while the curvature of the surface is followed by the cutter 2 by way of displacement of the hoists 5 and 6.

Elevation or lowering of the frame 1 of the grape harvester during a preliminary adjustment of the machine according to the trellis canopy is effected by the power cylinder 69 of the tractor, when said cylinder produces action on the arms 67, thus effecting its parallel elevation or lowering.

Such a flexible suspension enables the working member 2, mainly with a cutter, three degrees of freedom, providing a proper adjustment under the canopy of an inclined trellis and a more complete yield of quality grapes.

Although the present invention has been described with reference to an exemplary embodiment thereof, various alterations and modifications can be made without departing from the spirit and scope of the invention, as those skilled in the art may easily understand.

These alterations and modifications are to be considered as falling within the essence and scope of the invention, as specified in the appended claims.

We claim:

1. A grape harvester comprising: a support frame; inclined guide means secured on said frame; a carriage mounted on said inclined guide means for displacement therealong; two hoists, each with an independent control arranged on said carriage; and a working member including a cutter having opposite ends respectively mounted on said hoists, said hoists being independently raisable and lowerable to modify the elevation and attitude of the working member.

2. A grape harvester as claimed in claim 1 in which each hoist comprises a plurality of links connected as a lazy tongs linkage, the top links of the linkages of the hoists being hingeably connected to the working member, and comprising power means connected to the bottom links of the linkage of a respective hoist to raise and lower such hoist.

3. A grape harvester as claimed in claim 2, wherein said linkages are connected to the carriage for being raised and lowered in a direction substantially perpendicular to the direction of travel of the carriage on the guide means.

4. A grape harvester as claimed in claim 1, comprising drive means coupled to said carriage to move the same back and forth along said guide means.

References Cited

UNITED STATES PATENTS

| 1,627,258 | 5/1927 | Sullivan | 56—233 |
| 1,869,394 | 8/1932 | Sikma | 56—235 |
| 2,762,186 | 9/1956 | Janata | 56—233 |
| 2,893,194 | 7/1959 | Lamouria | 56—331 |

FOREIGN PATENTS

| 170,948 | 5/1906 | Germany | 56—233 |

RUSSELL R. KINSEY, Primary Examiner